Oct. 7, 1947.    F. W. BURGER    2,428,551
SAFETY WHEEL
Filed Dec. 19, 1942

Inventor:
Frederick W. Burger
By Walter E. Schirmer
Atty.

Patented Oct. 7, 1947

2,428,551

UNITED STATES PATENT OFFICE 2,428,551

SAFETY WHEEL

Frederick W. Burger, Niles, Mich., assignor to Clark Equipment Company, Buchanan, Mich., a corporation of Michigan Application December 19, 1942, Serial No. 469,752

2 Claims. (Cl. 152—409)

This invention relates to safety wheels, and is more particularly concerned with a safety rim for use in combat type vehicles where the beads of the rim are held by a rim blocking ring, and considerable danger is present if it is attempted to remove the tire from the rim without fully deflating the tire. This type of rim is useful for combat purposes, since the vehicle can be driven on the tire during actual combat for some period of time without damage to the casing. However, when it is desired to remove the casing with a removable rim lock, there is the attendant danger that if the tire is not deflated the loosening of the locking bolts will cause the side ring to blow out directly at the operator, in some cases causing severe injury.

The present invention contemplates eliminating this hazard by providing a construction in which the rim locking bolts, of normal hexagonal head design, are not accessible by use of ordinary flat open end type wrenches or socket wrenches until the tire has been deflated to an extent such that the bead locking ring can be moved inwardly to provide access to the bolts. This insures that the tire must be deflated before the bead locking ring is capable of removal, and thus substantially eliminates the hazard referred to above.

This, and other objects and advantages of the present invention will be more apparent from the following detailed description which, taken in conjunction with the accompanying drawings, will disclose to those skilled in the art the particular construction and operation of the preferred form of the present invention.

Figure 1:
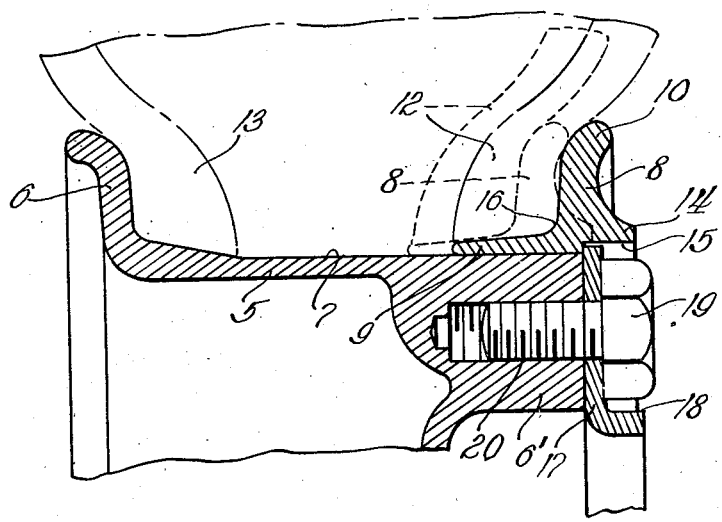
Figure 1 is a sectional view of one form of the present invention.

Referring first to Figure 1, there is shown in this form of the invention a rim 5 having an integral fixed bead flange 6 at one side thereof and having circumferentially spaced thickened bosses 6' disposed radially inwardly of the annular surface of the rim adjacent the opposite side thereof.

Arranged for axial sliding movement on the annular surface 7 of the rim is a separable rim flange 8 which is provided with the cylindrical extension 9 having sliding fit over the surface 7 of the rim and having the radially flanged portion 10 forming a bead support for the tire bead 12. The flange 6 forms a support for the opposite tire bead 13. The separable flange 8 is also provided with an axial outwardly projecting flange portion 14 which has an inner annular surface 15 of slightly larger diameter than the inner annular surface of the extension 9. This forms a radial shoulder 16 against which is engaged the lock ring 17, this lock ring fitting up against the boss 6', and when in position, serving to lock the rim flange 8 against axial outward movement. The lock ring 17 is provided adjacent its inner diameter with an axially extending flange 18, the ring 17 with the flange 18 providing means for preventing access to the head 19 of the bolt 20 by means of an open end wrench. The overhang of flanges 14 and 18 for substantially the entire longitudinal extent of the head 19 prevents the application of normal open end type wrenches or socket wrenches to the head of the bolt unless the separable rim flange 8 is moved axially inwardly.

The construction as shown in full lines is the position the parts assume when the tire is inflated.

When it is desired to remove the tire from the rim 5, it will be apparent that the head 19 of the bolt 20 is inaccessible by means of either a socket or open end wrench until such time as the tire has been deflated a sufficient amount to allow the separable rim flange 8 to be moved inwardly to the dotted line position, which can only be accomplished when the tire has been substantially completely deflated. When the ring has been moved into this point, the bolt 20 is accessible for removal to allow removal of ring 17, and consequently removal of the separable rim flange 8 whereby the tire can be removed.

Figure 2:
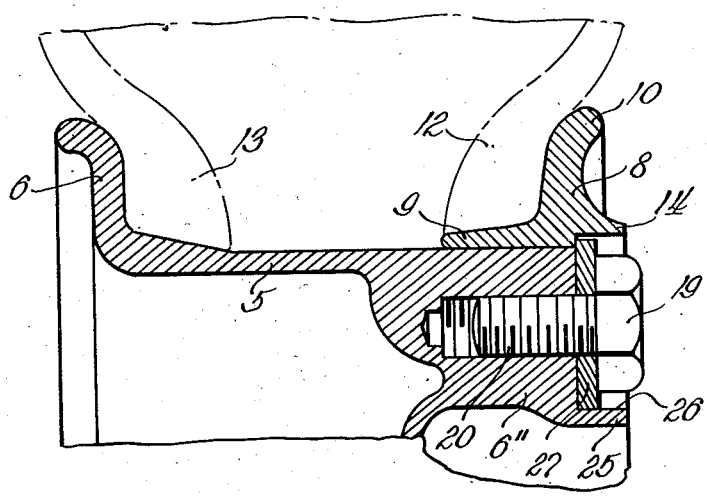
Figure 2 is a view of a slightly modified form of the invention.

In the form of the invention shown in Figure 2, similar parts are indicated by corresponding reference numerals.

However, in this form of the invention the boss 6'' of the rim 5 is provided with an axial extension 25, which forms an annular seat 26 for the lock ring 27, which lock ring in this case is merely an annular disc held against the radial surface of the boss 6'' by means of the bolt 20. The extension 25, together with the extension 14 of the separable rim flange 8 prevents access to the bolt head 19 until such time as the tire has been deflated an amount sufficient to allow the rim flange 8 to be moved axially inwardly so that its flange 14 will clear the head of the bolt 20. The flange 25 is so arranged relative to the longitudinal extent of head 19 as to prevent the use of an open end wrench on the head 19 of the bolt, but is spaced a sufficient distance to allow the use of a socket wrench when the rim flange 8 has been moved axially inwardly by substantially complete deflation of the tire.

It is submitted that with this construction the same results are achieved as with the construction shown in Figure 1 in which the lock ring 17 is provided with the flange 18.

I am aware that various changes may be made in certain details of the present construction, and I therefore do not intend to be limited except as defined by the scope and spirit of the appended claims.

I claim:

1. In a wheel, a rim member having a fixed bead flange on one side edge thereof and a circumferentially spaced series of radially inwardly extending bolt receiving bosses at the other side edge thereof, an annular separable rim flange axially slideable over said rim member from said other side edge thereof and having an axially outwardly directed annular flange portion defining a radially inwardly opening annular recess on its inner periphery overhanging said other side edge, a clamp ring engaged axially in said recess to limit axial outward movement of said separable rim flange over said rim member, bolts for clamping said clamp ring to said bosses, the annular defining wall of said recess closely overhanging the axial extent of the heads of said bolts, and extending to the chamfered end faces of the bolt heads and means projecting axially outwardly, radially inwardly of said bolts and adjacent thereto, cooperating with and of substantially the same axial extent as said overhanging wall to prevent access by means of ordinary wrenches to said bolts unless said separable rim flange is moved axially inwardly a distance sufficient to expose the side face of said bolt head.

2. In a safety wheel, a rim member having a fixed bead flange on one side edge thereof and a circumferentially spaced series of radially inwardly extending bolt receiving bosses at the other side edge thereof, an annular separable rim flange axially slideable over said rim member from said other side edge thereof for supporting the pneumatic tire thereon and having an axially directed flange wall defining a radially inwardly opening annular recess on its inner periphery overhanging said other side edge, a clamp ring engaging axially within said recess to limit axial outward movement of said separable rim flange over said rim member, bolts for clamping said clamp ring to said bosses on said rings, the heads of said bolts being disposed radially within and adjacent the overhanging portion of said separable rim flange, and means projecting axially outwardly radially inwardly of and adjacent said bolt heads and cooperating with said overhanging portion of said separable rim flange for preventing access to the heads of said bolts by ordinary flat or socket type wrenches unless said rim flange is moved axially inwardly a distance sufficient to expose the bolt head radially, said overhanging portion and said last-named means when in normal position extending substantially over the entire longitudinal extent of the heads of said bolts up to the chamfered end faces thereof.

FREDERICK W. BURGER.

REFERENCES CITED

The following references are of record in the file of this patent:

UNITED STATES PATENTS

| Number | Name | Date |
|---|---|---|
| 1,207,975 | Mills | Dec. 12, 1916 |
| 2,145,525 | Pedro | Jan. 31, 1939 |
| 2,229,724 | Burger | Jan. 28, 1941 |
| 969,929 | Williams | Sept. 13, 1910 |